United States Patent
Hann et al.

(10) Patent No.: US 6,535,520 B1
(45) Date of Patent: Mar. 18, 2003

(54) SYSTEM AND METHOD OF OPERATION FOR MANAGING DATA COMMUNICATION BETWEEN PHYSICAL LAYER DEVICES AND ATM LAYER DEVICES

(75) Inventors: William Patrick Hann, Round Rock, TX (US); William Keith Brewer, Austin, TX (US); Matthew Irvin, Austin, TX (US); Richard L. House, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/134,491

(22) Filed: Aug. 14, 1998

(51) Int. Cl.$^7$ ............................. H04J 3/02; H04L 12/43

(52) U.S. Cl. ...................................... 370/461; 370/462

(58) Field of Search ................................ 370/458, 461, 370/462, 447, 443, 449, 438, 439, 463

(56) References Cited

U.S. PATENT DOCUMENTS

| | | | |
|---|---|---|---|
| 3,532,827 A | 10/1970 | Ewin | 179/18 |
| 3,821,484 A | 6/1974 | Sternung et al. | 179/18 EB |
| 4,002,849 A | 1/1977 | Kotler et al. | 179/18 EB |
| 4,282,408 A | 8/1981 | Stauers | 179/18 FA |
| 4,438,511 A | 3/1984 | Baran | 370/19 |
| 4,586,175 A | * 4/1986 | Bedard et al. | 370/461 |
| 4,665,514 A | 5/1987 | Ching et al. | 370/60 |
| 4,679,227 A | 7/1987 | Hughes-Hartogs | 379/98 |

(List continued on next page.)

FOREIGN PATENT DOCUMENTS

| | | |
|---|---|---|
| EP | 0677941 A2 | 10/1995 |
| JP | 62084646 | 4/1987 |
| JP | 62222755 | 9/1987 |
| JP | 63-76648 | 4/1988 |
| JP | 02271763 | 11/1990 |
| JP | 04100367 | 4/1992 |
| WO | WO 86/02796 | 5/1986 |
| WO | WO 95/20282 | 7/1995 |
| WO | WO 96/04729 | 2/1996 |
| WO | WO 97/37458 | 10/1997 |

OTHER PUBLICATIONS

"Utopia Specification Level 1, Version 2.01," (af–phy–0017.000), *The ATM Forum Committee*, Mar. 21, 1994, 19 pages.

Horst Hessenmüller, et al., Zugangsnetzstrukturen für interaktive Videodienste (Teil 1), *Fernmelde Ingenieur, Der*, vol. 48, No. 8, XP000647017, Aug., 1994, Germany, pp. 1–32 (with English translation).

Horst Hessenmüller, et al., Zugangsnetzstrukturen für interaktive Videodienste (Teil 2), *Fernmelde Ingenieur*, vol. 48, No. 9, XP000619688, Sep., 1994, Germany, pp. 1–28 (with English translation).

Anthony Alles, "ATM Internetworking," *Cisco Systems, Inc.*, May 1995, 59 pages.

"Utopia Level 2, Version 1.0," (af–phy–0039.000), *The ATM Forum Committee*, Jun. 1995, 69 pages.

Primary Examiner—Steven Nguyen
Assistant Examiner—Phuongchau Ba Nguyen
(74) Attorney, Agent, or Firm—Baker Botts L.L.P.

(57) ABSTRACT

A system for managing data communication between physical layer devices and ATM layer devices in a cell based ATM network includes a plurality of low speed physical layer devices, a high speed physical layer device, and a bus connected to the physical layer devices. A bus interface device is coupled to the bus, the low speed physical layer devices, and the high speed physical layer device. The bus interface device permits equal opportunities to access the bus to any connected physical layer device. An arbiter is coupled to the low speed physical layer devices, the high speed physical layer device, and the bus interface device. The arbiter provides the high speed physical layer device with disproportionately frequent access to the bus.

37 Claims, 2 Drawing Sheets

U.S. PATENT DOCUMENTS

| | | | |
|---|---|---|---|
| 4,723,267 A | 2/1988 | Jones et al. ................... 379/93 |
| 4,731,816 A | 3/1988 | Hughes-Hartogs ........... 379/98 |
| 4,757,495 A | 7/1988 | Decker et al. ................ 370/76 |
| 4,771,425 A | 9/1988 | Baran et al. .................. 370/85 |
| 4,782,512 A | 11/1988 | Hutton ......................... 379/98 |
| 4,819,228 A | 4/1989 | Baran et al. .................. 370/85 |
| 4,833,706 A | 5/1989 | Hughes-Hartogs ........... 379/98 |
| 4,841,561 A | 6/1989 | Hill .............................. 379/97 |
| 4,866,702 A * | 9/1989 | Shimizu et al. ............. 370/462 |
| 4,903,261 A | 2/1990 | Baran et al. ................ 370/94.2 |
| 4,949,355 A | 8/1990 | Dyke et al. ................... 375/10 |
| 4,975,906 A | 12/1990 | Takiyasu et al. ......... 370/85.13 |
| 4,980,897 A | 12/1990 | Decker et al. ................ 375/38 |
| 4,985,889 A | 1/1991 | Frankish et al. ........... 370/94.1 |
| 5,020,058 A | 5/1991 | Holden et al. .............. 370/109 |
| 5,025,469 A | 6/1991 | Bingham ...................... 379/98 |
| 5,054,034 A | 10/1991 | Hughes-Hartons ............. 375/8 |
| 5,059,925 A | 10/1991 | Weisbloom ................. 331/1 A |
| 5,072,449 A | 12/1991 | Enns et al. ................. 371/37.1 |
| 5,088,032 A | 2/1992 | Bosack ....................... 395/200 |
| 5,115,431 A | 5/1992 | Williams et al. ........... 370/94.1 |
| 5,119,402 A | 6/1992 | Ginzburg et al. ............. 375/17 |
| 5,119,403 A | 6/1992 | Krishnan ...................... 375/39 |
| 5,128,945 A | 7/1992 | Enns et al. ................. 371/37.1 |
| 5,134,611 A | 7/1992 | Steinka et al. ................ 370/79 |
| 5,185,763 A | 2/1993 | Krishnan ...................... 375/39 |
| 5,198,818 A | 3/1993 | Samueli et al. ............. 341/144 |
| 5,199,071 A | 3/1993 | Abe et al. ..................... 379/38 |
| 5,202,884 A | 4/1993 | Close et al. ................ 370/94.1 |
| 5,206,886 A | 4/1993 | Bingham ...................... 375/97 |
| 5,214,650 A | 5/1993 | Renner et al. ........... 370/110.1 |
| 5,222,077 A | 6/1993 | Krishnan ...................... 375/39 |
| 5,224,099 A | 6/1993 | Corbalis et al. ........... 370/94.2 |
| 5,228,062 A | 7/1993 | Bingham ...................... 375/97 |
| 5,247,347 A | 9/1993 | Litteral et al. ................ 358/85 |
| 5,253,348 A * | 10/1993 | Scalise ....................... 370/462 |
| 5,255,291 A | 10/1993 | Holden et al. .............. 375/111 |
| 5,274,631 A | 12/1993 | Bhardwaj .................... 370/60 |
| 5,274,635 A | 12/1993 | Rahman et al. ............. 370/60.1 |
| 5,274,643 A | 12/1993 | Fisk ........................... 370/94.1 |
| 5,282,155 A | 1/1994 | Jones ..................... 364/724.19 |
| 5,285,474 A | 2/1994 | Chow et al. ................... 375/13 |
| 5,293,402 A | 3/1994 | Crespo et al. ................. 375/14 |
| 5,295,159 A | 3/1994 | Kerpez ......................... 375/38 |
| 5,313,454 A | 5/1994 | Bustini et al. ................. 370/13 |
| 5,317,562 A | 5/1994 | Nardin et al. .................. 370/16 |
| 5,331,670 A | 7/1994 | Sorbara et al. ............. 375/111 |
| 5,337,348 A | 8/1994 | Yamazaki et al. ............. 379/94 |
| 5,339,355 A | 8/1994 | Mori et al. .................... 379/94 |
| 5,341,474 A | 8/1994 | Gelman et al. .............. 395/200 |
| 5,345,437 A | 9/1994 | Ogawa .......................... 370/13 |
| 5,359,592 A | 10/1994 | Corbalis et al. ............... 370/17 |
| 5,367,540 A | 11/1994 | Kakuishi et al. ............. 375/103 |
| 5,369,748 A * | 11/1994 | McFarland et al. ......... 370/447 |
| 5,371,532 A | 12/1994 | Gelman et al. ................ 348/7 |
| 5,379,441 A | 1/1995 | Watanabe et al. ........... 395/800 |
| 5,390,239 A | 2/1995 | Morris et al. ................. 379/93 |
| 5,394,394 A | 2/1995 | Crowther et al. ............. 370/60 |
| 5,400,322 A | 3/1995 | Hunt et al. .................... 370/19 |
| 5,404,388 A | 4/1995 | Eu ................................ 379/24 |
| 5,408,260 A | 4/1995 | Arnon ............................ 348/6 |
| 5,408,522 A | 4/1995 | Ikehata et al ................. 379/98 |
| 5,408,614 A | 4/1995 | Thornton et al. ............ 395/275 |
| 5,410,264 A | 4/1995 | Lechleider .................. 327/311 |
| 5,410,343 A | 4/1995 | Coddington et al. ........... 348/7 |
| 5,414,455 A | 5/1995 | Hooper et al. ................. 348/7 |
| 5,414,733 A | 5/1995 | Turner ........................ 375/233 |
| 5,422,876 A | 6/1995 | Turudic ........................ 370/15 |
| 5,422,880 A | 6/1995 | Heitkamp et al. ............. 370/60 |
| 5,428,608 A | 6/1995 | Freeman et al. ........... 370/60.1 |
| 5,430,715 A | 7/1995 | Corballis et al. .............. 370/54 |
| 5,430,793 A | 7/1995 | Ueltzen et al. ................ 379/93 |
| 5,434,863 A | 7/1995 | Onishi et al. ............. 370/85.13 |
| 5,440,335 A | 8/1995 | Beveridge ..................... 348/13 |
| 5,442,390 A | 8/1995 | Hooper et al. ................. 348/7 |
| 5,452,306 A | 9/1995 | Turudic et al. ........... 370/110.1 |
| 5,453,779 A | 9/1995 | Dan et al. ....................... 348/7 |
| 5,461,415 A | 10/1995 | Wolf et al. ..................... 348/7 |
| 5,461,616 A | 10/1995 | Suzuki ......................... 370/79 |
| 5,461,624 A | 10/1995 | Mazzola .................. 370/85.13 |
| 5,461,640 A | 10/1995 | Gatherer ..................... 375/231 |
| 5,463,624 A * | 10/1995 | Hogg et al. ................. 370/461 |
| 5,469,495 A | 11/1995 | Beveridge ..................... 379/56 |
| 5,473,599 A | 12/1995 | Li et al. ........................ 370/16 |
| 5,473,607 A | 12/1995 | Hausman et al. ......... 370/85.13 |
| 5,475,735 A | 12/1995 | Williams et al. .............. 379/59 |
| 5,477,263 A | 12/1995 | O'Callaghan et al. .......... 348/7 |
| 5,479,447 A | 12/1995 | Chow et al. ................. 375/260 |
| 5,495,483 A | 2/1996 | Grube et al. ............... 370/95.1 |
| 5,504,736 A | 4/1996 | Cubbison, Jr. ............... 370/13 |
| 5,504,753 A | 4/1996 | Renger et al. ............. 371/20.1 |
| 5,506,868 A | 4/1996 | Cox et al. ................... 375/222 |
| 5,509,006 A | 4/1996 | Wilford et al. ............... 370/60 |
| 5,513,251 A | 4/1996 | Rochkind et al. ............. 379/93 |
| 5,517,488 A | 5/1996 | Miyazaki et al. .............. 370/16 |
| 5,519,704 A | 5/1996 | Farinacci et al. ........ 370/85.13 |
| 5,526,344 A * | 6/1996 | Diaz et al. ................... 370/462 |
| 5,528,585 A | 6/1996 | Cooley et al. ................. 370/56 |
| 5,546,379 A | 8/1996 | Thaweethai et al. .......... 370/17 |
| 5,555,244 A | 9/1996 | Gupta et al. ................. 370/60.1 |
| 5,561,663 A | 10/1996 | Klausmeier ................... 370/17 |
| 5,561,669 A | 10/1996 | Lenney et al. ............. 370/60.1 |
| 5,570,360 A | 10/1996 | Klausmeier et al. .......... 370/60 |
| 5,574,724 A | 11/1996 | Bales et al. ................. 370/68.1 |
| 5,583,862 A | 12/1996 | Callon ........................ 370/397 |
| 5,583,872 A | 12/1996 | Albrecht et al. ............ 370/476 |
| 5,598,406 A | 1/1997 | Albrecht et al. ............ 370/296 |
| 5,598,581 A | 1/1997 | Daines et al. ............... 395/872 |
| 5,600,712 A | 2/1997 | Hanson et al. .............. 379/142 |
| 5,602,902 A | 2/1997 | Satterlund et al. ............ 379/59 |
| 5,604,741 A | 2/1997 | Samueli et al. ............. 370/402 |
| 5,612,957 A | 3/1997 | Gregerson et al. .......... 370/401 |
| 5,617,417 A | 4/1997 | Sathe et al. ................. 370/394 |
| 5,617,421 A | 4/1997 | Chin et al. .................. 370/402 |
| 5,631,897 A | 5/1997 | Pacheco et al. ............. 370/237 |
| 5,632,021 A | 5/1997 | Jennings et al. ............ 395/306 |
| 5,649,001 A | 7/1997 | Thomas et al. .......... 379/93.07 |
| 5,666,353 A | 9/1997 | Klausmeier et al. ........ 370/230 |
| 5,668,857 A | 9/1997 | McHale ................... 379/93.07 |
| 5,673,265 A | 9/1997 | Gupta et al. ................. 370/432 |
| 5,678,004 A | 10/1997 | Thaweethai ............. 595/187.01 |
| 5,687,176 A | 11/1997 | Wisnienski et al. .......... 370/476 |
| 5,691,997 A | 11/1997 | Lackey, Jr. ................... 371/53 |
| 5,729,546 A | 3/1998 | Gupta et al. ................. 370/434 |
| 5,732,079 A | 3/1998 | Castrigno ................... 370/362 |
| 5,737,364 A | 4/1998 | Cohen et al. |
| 5,737,526 A | 4/1998 | Periasamy et al. ...... 395/200.06 |
| 5,737,635 A | 4/1998 | Daines et al. ............... 395/872 |
| 5,740,171 A | 4/1998 | Mazzola et al. ............. 370/392 |
| 5,740,176 A | 4/1998 | Gupta et al. ................. 370/440 |
| 5,742,604 A | 4/1998 | Edsall et al. ................. 370/401 |
| 5,742,649 A | 4/1998 | Muntz et al. ................. 375/371 |
| 5,751,710 A | 5/1998 | Crowther et al. ............ 370/423 |
| 5,756,280 A | 5/1998 | Soora et al. ................. 455/4.2 |
| 5,764,636 A | 6/1998 | Edsall .......................... 370/401 |
| 5,764,641 A | 6/1998 | Lin .............................. 370/412 |
| 5,765,032 A | 6/1998 | Valizadeh ............... 395/200.65 |
| 5,770,950 A | 6/1998 | Zurcher et al. ................ 326/30 |
| 5,781,617 A | 7/1998 | McHale et al. .......... 379/93.14 |
| 5,787,070 A | 7/1998 | Gupta et al. ................. 370/217 |
| 5,787,255 A | 7/1998 | Parlan et al. ........... 395/200.63 |

| | | | |
|---|---|---|---|
| 5,793,763 A | 8/1998 | Mayes et al. ................ 370/389 |
| 5,793,978 A | 8/1998 | Fowler .................. 395/200.56 |
| 5,793,987 A | 8/1998 | Quackenbush et al. ..... 395/280 |
| 5,796,732 A | 8/1998 | Mazzola et al. ............ 370/362 |
| 5,799,017 A | 8/1998 | Gupta et al. ................ 370/419 |
| 5,802,042 A | 9/1998 | Natarajan et al. ........... 370/255 |
| 5,805,595 A | 9/1998 | Sharper et al. ............. 370/442 |
| 5,812,618 A | 9/1998 | Muntz et al. ................ 375/372 |
| 5,812,786 A | 9/1998 | Seazholz et al. ....... 395/200.63 |
| 5,822,383 A | 10/1998 | Muntz et al. ................ 375/362 |
| 5,835,036 A | 11/1998 | Takefman .................... 341/95 |
| 5,835,481 A | 11/1998 | Akyol et al. ................ 370/216 |
| 5,835,494 A | 11/1998 | Hughes et al. .............. 370/397 |
| 5,835,725 A | 11/1998 | Chiang et al. ......... 395/200.58 |
| 5,838,915 A | 11/1998 | Klausmeier et al. ... 395/200.45 |
| 5,838,994 A | 11/1998 | Valizadeh ................... 395/876 |
| 5,852,655 A | 12/1998 | McHale et al. .......... 379/93.14 |
| 5,859,550 A | 1/1999 | Brandt ....................... 327/156 |
| 5,864,542 A | 1/1999 | Gupta et al. ................ 370/257 |
| 5,867,666 A | 2/1999 | Harvey .................. 395/200.68 |
| 5,901,146 A * | 5/1999 | Upp ........................... 370/462 |

\* cited by examiner

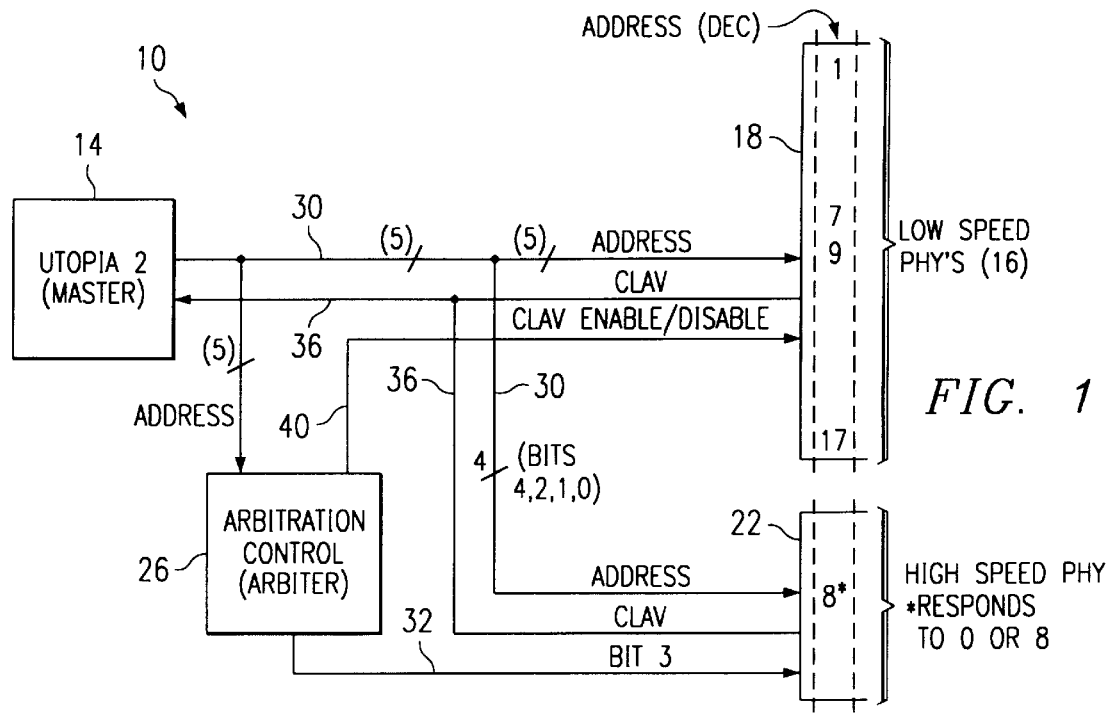
*FIG. 1*
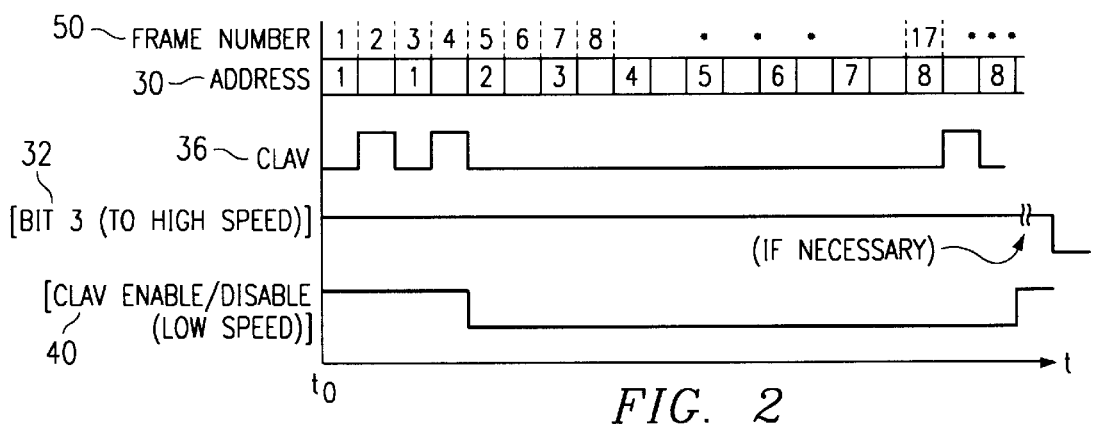
*FIG. 2*
| STATE | CLAV ENABLE/DISABLE (40) | ADDITIONAL ADDRESS LINE (BIT 3) (32) |
|---|---|---|
| 64 — POLL1 | 1 | 1 |
| 70 — POLL2HS | 1 | 1 |
| 74 — POLL2LS | 1 | 1 |
| 78 — CNT_POLLS | 1 | 0 |
| 82 — W4POLLHS | 0 | 1 |
| 86 — POLL_HS | 0 | 0 |
| 90 — W4POLLHS_2 | 0 | 1 |
| 94 — POLL_HS_2 | 0 | 1 |
*FIG. 3B*

SYSTEM AND METHOD OF OPERATION FOR MANAGING DATA COMMUNICATION BETWEEN PHYSICAL LAYER DEVICES AND ATM LAYER DEVICES

TECHNICAL FIELD OF THE INVENTION

The present invention relates in general to data communication, and more specifically to a system and method of operation for managing data communication between physical layer devices and ATM layer devices.

BACKGROUND OF THE INVENTION

Asynchronous transfer mode (ATM) communication systems are widely used for network communications. In general, ATM communication protocols involve stacks having several layers including a physical layer as the lowest layer. The ATM physical layer typically involves the movement of cells between source and target physical layer devices. The cells are often moved across a bus in smaller parallel sets of data. When the data reaches the target device, the cell is reconstructed and then sent up the stack to its final destination. One example of an ATM physical layer protocol is the UTOPIA 2 protocol. The physical layer devices, between which data must be moved at the ATM physical layer, can, and often do, have varying data rates.

SUMMARY OF THE INVENTION

In accordance with the present invention, a system and method of operation for managing data communication between physical layer devices are disclosed. This system and method provide advantages over those previously developed systems.

According to one aspect of the present invention, a system is provided for managing data communication between physical layer devices. The system includes a plurality of low speed physical layer devices and a high speed physical layer device. Each of the physical layer devices is connected to a bus. The bus is coupled to a bus interface device which is coupled to the low speed physical layer devices and the high speed physical layer device. The bus interface device is operable to provide the physical layer devices with equal opportunities to access to the bus. The system also includes an arbiter which is coupled to the low speed physical layer devices, the high speed physical layer device and the bus interface device. The arbiter is operable to provide the high speed device with disproportionately frequent access to the bus.

More specifically, the arbiter is also operable to enable and disable the ability of the physical layer devices to accept an opportunity to access the bus.

In one particular embodiment, the system's low speed physical layer devices are coupled to DSL modems and the high speed physical layer device is coupled to an OC3 network. A further embodiment can include a system which communicates ATM cells using a UTOPIA 2 protocol. A further embodiment can include a programmable logic device as the arbiter.

In accordance with another aspect of the present invention, a method is provided for managing data communication between physical layer devices. The method comprises using a bus interface device to offer multiple low speed physical layer devices and a high speed physical layer device in-turn access to a bus. An arbiter monitors the offers of in-turn access. The ability of the individual physical layer devices to accept the offers of in-turn access is selectively enabled and disabled such that the high speed physical layer device is ensured disproportionately frequent access to the bus.

A technical advantage of the present invention includes a data communication system that allows for the mixing of a high speed physical layer device with a plurality of low speed physical layer devices such that the high speed device can be a less expensive "off the shelf" device with a small first-in first-out (FIFO) buffer.

Another technical advantage of the present invention includes a data communication system and method which protects against data loss. As small office and home office users (SOHO's) desire increased access to information and, therefore, data carrying capacity, the need for cost effective and reliable systems will increase. The present system and method make possible a less expensive and reliable data communication system which protects against lost data.

A further important technical advantage of the present invention is the polling scheme created within the system. The scheme can prevent the high speed physical layer device from placing useless data on the bus.

Other important technical advantages are readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 1 is a block diagram of one embodiment of a system for managing data communication between physical layer devices according to the present invention;

FIG. 2 is a signal timing diagram of the operation of the embodiment of FIG. 1;

FIG. 3B is a table of output signals of the arbiter corresponding to the states of FIG. 3A.

DETAILED DESCRIPTION OF THE INVENTION

Figure 3A:
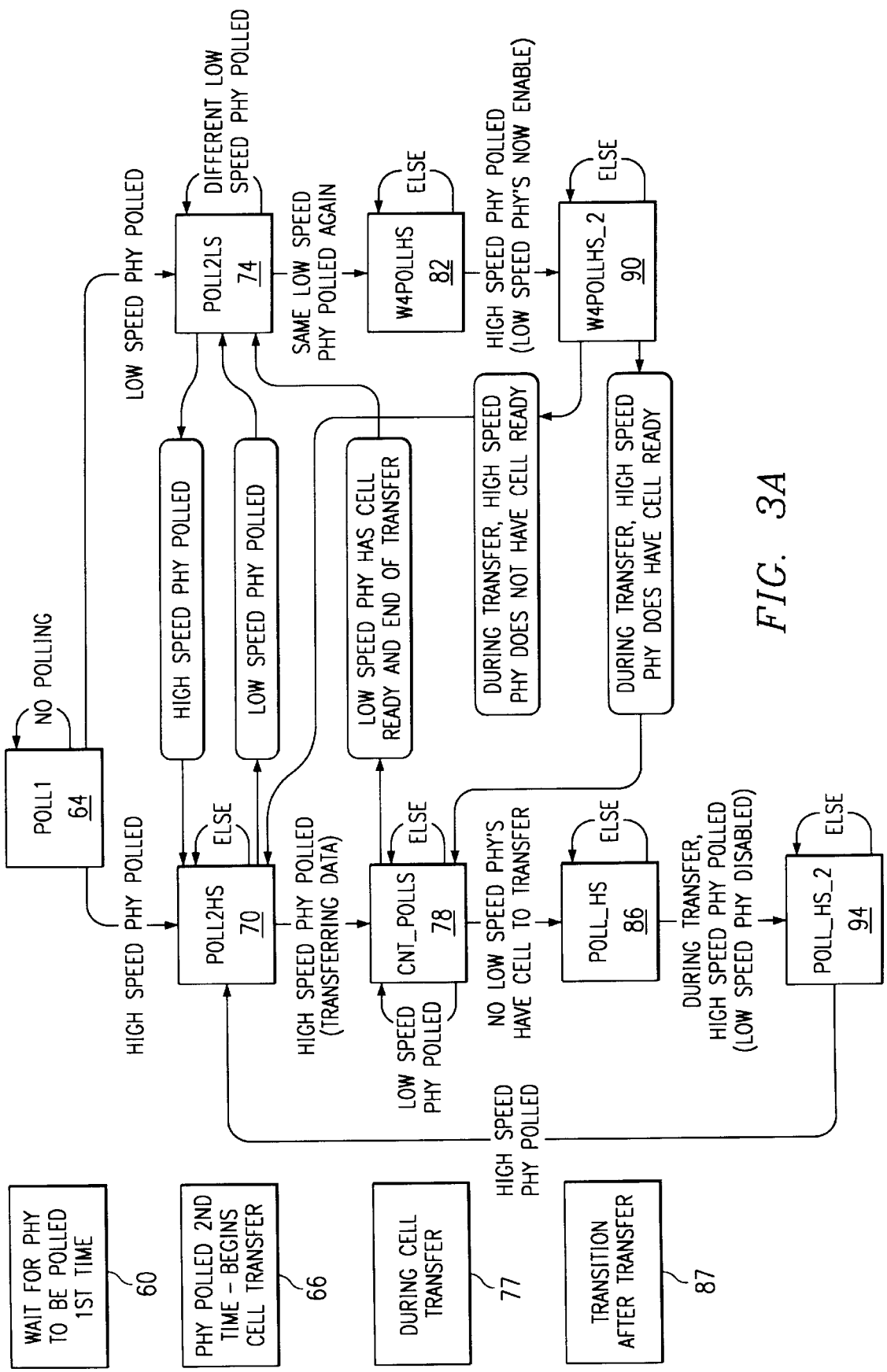
FIG. 3A is state diagram of the operation of one embodiment of an arbiter according to the present invention.

A data communication system employing a given protocol typically manages data transmission between physical layer devices across a bus. While the speed of transmission across the bus generally will not change, the operational speeds of the different physical layer devices connected to the bus system may vary.

For example, a central office may serve as a hub for a cell based asynchronous transfer mode (ATM) network. In such a network, lower speed ATM communication takes place between various customer premises and the central office. In turn, higher speed ATM communication takes place through a high speed back-end device, which supports communication between the central office and other central offices.

In such a system, the central office may include a bank of modems operating at 2 Mbps to support the lower speed communication, and a high speed back-end operating at 155 Mbps to support the higher speed communications. The modems, in turn connect to lower speed physical layer devices and the high speed back-end couples to a higher speed physical layer device. The low speed physical layer devices must communicate with the higher speed physical layer device to transfer data to and from the high speed physical layer devices. To do so, all of these physical layer devices need access to a bus.

A bus interface device manages the bus access among the physical layer devices. A typical bus interface device may provide an equal opportunity for each connected physical layer device to access the bus. For example, the bus interface may simply scroll through the physical layer devices, addressing each physical layer device in turn. However, this type of access management forces the high speed back-end to wait until all the low speed modems have had an opportunity to use the bus. This waiting may result in the loss of the high speed back-end's data.

As a result of its higher operational speed, a high speed back-end takes in and puts out more data than a low speed device. As such, high speed back-ends need more frequent access to the pathways provided by the bus. This is especially true when the high speed back-end has a limited buffer (for example, a FIFO buffer) which is common in less expensive "off the shelf" back-ends.

In accordance with the present invention, the disadvantages and problems associated with managing the data communication of physical layer devices with different operational speeds have been substantially reduced or eliminated. In particular, a system and method for managing data communication between physical layer devices are disclosed that regulate data transmission in a data communication system with physical layer devices of different operational speeds such that the high speed device does not lose data on account of waiting for bus access.

In the following description of the invention, states of various signals are discussed in digital terms, such as "0" or "1", but is not intended to limit the scope of the invention to a digital application. It may be possible to implement the current invention with an analog implementation, for example with a voltage threshold corresponding to a "1". Furthermore, it is possible that the various states could be switched in an implementation.

FIG. 1 is a block diagram of one embodiment of a system for managing data communication between physical layer devices according to the present invention. The system, indicated generally at 10, includes a bus interface device 14. Bus interface device 14 couples to a plurality of low speed physical layer devices (PHYs) 18 and to a high speed PHY 22. An arbiter 26 couples to bus interface device 14, high speed PHY 22, and low speed PHYs 18.

In the embodiment shown, system 10 uses the UTOPIA 2 protocol, and bus interface device 10 comprises a UTOPIA 2 MASTER. In addition, the plurality of low speed PHYs 18 comprises sixteen low speed devices.

Bus interface device 14 is coupled to low speed PHYs 18, high speed PHY 22, and arbiter 26,via address lines 30. In the embodiment of FIG. 1, address lines 30 comprise five address lines. All five address lines 30 couple between bus interface device 14 and low speed PHYs 18 and arbiter 26. However, only 4 address lines 30 are coupled between bus interface device 14 and high speed PHY 22. An additional address line 32 couples between arbiter 26 and high speed PHY 22. As shown, address lines 30 can be referenced as bits 0–4 of an address, and additional address line 32 can serve as bit 3 of the address of high speed PHY 22.

A cell available (CLAV) line 36 is coupled between low speed PHYs 18, high speed PHY 22, and bus interface device 14. A CLAV enable/disable line 40 is coupled between arbiter 26 and low speed PHYs 18.

Low speed PHYs 18 and high speed PHY 22 are further coupled to a bus (not shown) for transferring data to the bus interface device 14.

In operation, bus interface device 14 is operable to provide any connected PHY an equal opportunity to access the bus. Bus interface device can do so, for example, by polling each connected PHY, including low speed PHYs 18 and high speed PHY 22, in sequence according to an address. Address lines 30 allow for a five bit address signal, or thirty-one connected PHYs (and one idle address). However, as the embodiment of FIG. 1 includes only seventeen connected PHYs, bus interface device 14 will scroll through addresses "0" through "17", and give each PHY corresponding to those addresses an opportunity to access the bus.

In FIG. 1, the sixteen low speed PHYs 18 are assigned addresses "1" through "7" and "9" through "17". High speed PHY 22 is assigned address "8". As stated above, arbiter 26 controls additional address line 32, which comprises bit "3" of the address for high speed PHY 22. By controlling additional address line 32, arbiter 26 can dictate the address that high speed PHY 22 will view from bus interface device 14. As necessary, arbiter 26 can force high speed PHY 22 to view an "8" if bus interface device 14 polls either "0" or "8." Alternatively, arbiter 26 can force high speed PHY 22 to view a "0" if bus interface device 14 polls either "0" or "8." In such a manner, arbiter 26 can provide high speed PHY 22 with disproportionately frequent access to the bus. Additionally, as explained below, the arbiter 26 can effectively disable high speed PHY 22 if necessary, such as in the middle of a cell transfer by the high speed PHY 22.

If a PHY has data to transfer on the bus, the PHY responds to the address poll through CLAV line 36, for example by setting CLAV line 36 to a "1". Thus, for example, if bus interface device 14 polls address "7", and the low speed PHY 18 corresponding to address "7" has data to transfer, CLAV line 36 will be set to a "1". Bus interface device 14 will then give the low speed PHY at address "7" access to the bus. If a PHY does not respond to the address poll, bus interface device 14 will poll the next PHY.

Further in operation, arbiter 26 can prevent low speed PHYs 18 from accepting an opportunity to access the bus. Arbiter 26 can manipulate CLAV enable/disable line 40, which in turn enables/disables low speed PHYs 18 from asserting CLAV line 36. Such operability allows arbiter 26 to provide high speed PHY 22 with "every other turn" access to the bus.

The present invention has application in a cell based ATM network environment where a plurality of low speed physical layer devices must transfer data to an ATM layer device, such as the bus interface device 14. Low speed PHYs 18 and high speed PHY 22 can communicate ATM cells, for example using a UTOPIA 2 protocol. Low speed PHYs 18 can be coupled to digital subscriber line (DSL) modems. High speed PHY 22 could be coupled to a fiber optic network.

FIG. 2 is a signal timing diagram of the operation of the embodiment of FIG. 1. Referencing FIGS. 1 and 2, FIG. 2 includes representations of the value of address lines 30 generated by bus interface device 14, the value of CLAV line 36, the value of additional address line 32 which is set by arbiter 26 and represents bit "3" of the address for high speed PHY 22, and the value of CLAV enable/disable 40 which is set by arbiter 26.

Referencing FIG. 2, in operation and separated into time delineated frames 50, address lines 30 indicates the polling signal from bus interface device to the individual PHYs. Initially, additional address line 32 is set to "1", meaning that the high speed PHY will interpret an address of "0" or "8" asIan "8." Further, CLAV enable/disable 40 is set to "1", meaning that the low speed PHYs are allowed to respond to a poll from the bus interface device.

In frame 1, bus interface device begins to poll all connected PHYs. In response to the poll of PHY 1, frame 2 indicates that CLAV line 36 was set to "1", indicating that the PHY at address "1" has a cell available and wishes to access the bus. In response to such an event, the bus interface device polls address "1" again in frame 3, to which CLAV line 36 is again set to "1" in frame 4. After receiving the second signal on CLAV line 36, the bus interface device grants access to the bus to the PHY at address "1" and then continues to poll to find another PHY with a cell available.

The arbiter monitors address lines 30 and recognizes the pattern described, meaning a low speed PHY has gained access to the bus. Therefore, arbiter sets CLAV enable/disable line 40 to "0". As long as CLAV enable/disable line 40 is "0", a low speed PHY will be unable to respond to a poll from the bus interface device, even if the low speed PHY contains a cell available to transmit on the bus. Because the arbiter has disabled their ability to send out CLAV's, the bus interface device is "convinced" the non-responsive PHYs do not have a cell available, and it continues its polling until it receives a response.

In the situation as described by FIG. 2, the bus interface device polls address "8" in frame 17. Because additional address line 32 is set to high, either a poll of address "8" or address "0" by the bus interface device will appear as a poll corresponding to the high speed PHY. The high speed PHY sets CLAV line 36 to "1" in frame 18, meaning the high speed PHY contains a cell available for transmission. The address is repeated, and the bus interface device grants access to the bus to the high speed PHY.

At this point, the arbiter adjusts enable/disable CLAV line 40 so that the low speed PHYs may again respond to a poll from the bus interface device. The bus interface device will poll nine through seventeen before circling back to zero, one, etc.

Further shown in FIG. 2 is that the arbiter will set additional address line 32 to "0" during the cell transfer "if necessary." When address line 32 is set to "0", the high speed PHY will never see an address of "8" from the bus interface device, effectively disabling the high speed PHY from responding to an opportunity to access the bus. Such an occurrence may be necessary to prevent the high speed PHY from responding during a cell transfer, as explained in more detail with respect to FIGS. 3A and 3B.

FIG. 3A is a state diagram of the operation of one embodiment of an arbiter according to the present invention. FIG. 3B is a table of output signals of the arbiter corresponding to the states of FIG. 3A. Referencing FIG. 1 and FIG. 3B, it is seen that arbiter 26 outputs additional address line 32 to high speed PHY 22 and arbiter 26 outputs CLAV enable/disable line 40 to low speed PHYs 18. In the following description of FIG. 3A, reference will be made to the values of additional address line 32 and CLAV enable/disable line 40 enable/disable line with respect to the various states of FIG. 3A. Such values are displayed in FIG. 3B. Explicit references to FIG. 3B will be omitted.

FIG. 3A separates the states of the arbiter into four time frames. Time frame 60 is the time frame that the arbiter is waiting for a PHY to be polled. State 64 (POLL1) is the initial state of the arbiter. CLAV enable/disable line 40 and additional address line 40 are both set to "1", meaning the low speed PHYs and the high speed PHY are enabled and can accept an opportunity to access to the bus. Additionally, as indicated above, the high speed PHY will interpret either a poll of "0" or "8" from the bus interface device as an "8".

As the bus interface device begins to poll the PHYs, the system moves to a time frame 66, wherein the arbiter discovers that a cell transfer begins. From state 64, the arbiter moves to state 70 (POLL2HS) if the high speed PHY is polled, or to state 74 (POLL2LS) if a low speed PHY is polled. In states 70 and 74, both outputs are still "1", meaning all PHYs are enabled.

From state 70, if a low speed PHY is subsequently polled, the arbiter moves to state 74. Similarly, from state 74, if a high speed PHY is subsequently polled, the arbiter moves to state 70.

From state 70, if the high speed PHY is polled again (meaning consecutively), the arbiter moves to state 78 (CNT_POLLS). The consecutive polling of the high speed PHY indicates the high speed PHY desires access to the bus. Likewise, a consecutive low speed PHY poll moves the arbiter from state 74 to state 82 (W4POLLHS). These two states are in the time frame 77 (during cell transfer).

At state 78, the arbiter sets additional address line 32 to "0". As discussed above, this effectively disables the high speed PHY from answering a poll with a cell available, because it will never see its own address ("8") polled by the bus interface device. The arbiter does so because with some high speed PHYs, if polled during a current transfer, the high speed PHY will respond with a cell available when actually there is no entire cell available.

During state 78, the arbiter is waiting for a transfer by the high speed PHY to complete. At the conclusion of the transfer, the arbiter transitions based on whether or not a low speed PHY has a cell ready to transfer.

If during the transfer at state 78, a low speed PHY responds with a cell available, the arbiter moves to state 74 at the end of the transfer. At state 74, the arbiter once again enables the high speed PHY by setting additional address line 32 to "1".

At state 82, the arbiter senses that a cell transfer by a low speed PHY is taking place. Thus, the arbiter sets CLAV enable/disable to "0". The arbiter remains in state 82 until it detects a poll of the high speed PHY.

Next, the arbiter transitions into time frame 87 (transition after transfer). From state 78, if no low speed PHY contains a cell to transfer, the arbiter moves to state 86 (POLL_HS). In state 86, the low speed PHYs and the high speed PHY are disabled. Once the high speed PHY transfer is complete, the arbiter can safely move to state 94 (POLL_HS_2) and once again enable the high speed PHY without encountering the danger discussed above regarding a premature cell available indication. The arbiter disables the low speed PHYs during this state. Since the low speed PHYs do not have a cell available, no cell will be transferred during this time slot. Once the arbiter detects another poll of the high speed PHY, the arbiter moves back to state 70. This allows interleaving transfers of high speed addresses of "0" and "8." This interleaving further allows interleaving of bank responses of addresses "1" through "7" and "9" through "17". The result of the interleaving is that the high speed PHY will have an opportunity to transmit every other time slot at alternating addresses "0" and "8". Additionally, the low speed PHYs will have an opportunity to transmit every other time slot at alternating banks of addresses "1" through "7" and "9" through "17".

From state 82, the arbiter moves to state 90 (W4POLLHS_2) when it detects a poll of the high speed PHY. At state 90, CLAV enable/disable 40 remains at "0", thus the low speed PHYs are disabled. This is done because the next time slot has been reserved for the high speed PHY. At state 90, at the end of a low speed PHY transfer and when a high speed PHY is polled, if the arbiter detects that the high speed PHY has a cell available, the arbiter moves to state 78. Otherwise, the arbiter moves to state 70.

In general terms, and referring to the embodiment of FIG. 1, the state diagram of FIG. 3A explains one method of providing the high speed PHY with disproportionate access to the bus. For example, in the embodiment of FIG. 1, address locations "1" through "7" could correspond to low speed PHYs, address "8" could correspond to a high speed PHY, and addresses "9" through "17" could correspond to additional low speed PHYs. When the bus interface device receives a cell available response from a PHY, the bus interface device polls that PHY again to make sure the PHY has a cell available. As the PHY transfers its cell, the system falls into the "during cell transfer" time frame.

At this point, the bus interface device continues sequential polling to find the next available PHY for the bus. Only now, the arbiter selectively enables and disables the ability of the PHYs to put out their respective CLAVs so that the high speed PHY is guaranteed every other time access to the bus.

After communicating that the PHY completes its transfer, the system enters the "transition after transfer" time frame which allows the arbiter to adjust its manipulation of PHY responsiveness to again ensure that the high speed PHY is guaranteed every other time access to the bus.

The embodiments discussed above focus primarily on the receive side of a UTOPIA 2 bus. However, the invention has application to the transmit side also, as well as other systems that exhibit sequential polling of physical layer devices.

Although the present invention has been described in detail, it should be understood that various changes, substitutions and alterations can be made hereto without departing from the spirit and scope of the invention.

What is claimed is:

1. A system for managing data communication between physical layer devices in a cell based ATM network, comprising:
    a plurality of low speed physical layer devices;
    a high speed physical layer device;
    a bus connected to the low speed physical layer devices and the high speed physical layer device;
    a bus interface device connected to the bus, the bus interface device further coupled to the low speed physical layer devices and the high speed physical layer device, the bus interface device operable to provide equal opportunities to access the bus, to any physical layer device connected to the bus; and
    an arbiter coupled to the low speed physical layer devices, the high speed physical layer device and the bus interface device, the arbiter operable to provide the high speed physical layer device with disproportionately frequent access to the bus.

2. The system of claim 1, wherein the arbiter is further operable to disable the low speed physical layer devices from accepting an opportunity to access the bus.

3. The system of claim 1, wherein the arbiter is a programmable logic device.

4. The system of claim 1, wherein the physical layer devices communicate ATM cells.

5. The system of claim 4, wherein the ATM cells are communicated using a Utopia 2 protocol.

6. The system of claim 1, wherein the low speed physical layer devices are coupled to DSL modems.

7. The system of claim 1, wherein the high speed physical layer device is coupled to a fiber optic network.

8. The system of claim 1, wherein the high speed physical layer device is coupled to coaxial network.

9. The system of claim 1, wherein the arbiter is operable to provide the high speed physical layer device with every other turn opportunities to access to the bus.

10. The system of claim 9, wherein the arbiter is further operable to provide the high speed physical layer device with multiple addresses, such that the high speed physical layer device alternates between addresses each opportunity to access the bus.

11. The system of claim 9, wherein the arbiter is operable to provide the low speed physical layer devices with every other turn opportunities to access the bus, the opportunities for the low speed physical layer devices alternating with the opportunities of the high speed physical layer device.

12. The system of claim 1, wherein the plurality of low speed physical layer devices comprises sixteen low speed physical layer devices.

13. The system of claim 1, further comprising five address lines coupled between the bus interface device and the low speed physical devices and the high speed physical device, wherein the bus interface device provides an opportunity to a connected physical layer device to access the bus by signaling an address on the five address lines.

14. The system of claim 13, wherein the low speed physical layer devices occupy addresses one through seven and nine through seventeen, and further wherein the high speed physical layer device occupies address 8.

15. A method for managing data communication between physical layer devices in a cell based ATM network, comprising:
    using a bus interface device to provide connected physical layer devices equal opportunities to access a bus;
    monitoring the opportunities to access the bus with an arbiter; and
    using the arbiter to selectively disable low speed physical layer devices connected to the bus from accepting an opportunity to access the bus such that a high speed physical layer device connected to the bus is allowed disproportionately frequent access to the bus.

16. The method of claim 15, wherein the arbiter is a programmable logic device.

17. The method of claim 15, wherein the physical layer devices communicate ATM cells.

18. The method of claim 17, wherein the ATM cells are communicated using a Utopia 2 protocol.

19. The method of claim 15, wherein the low speed physical layer devices are coupled to DSL modems.

20. The method of claim 15, wherein the high speed physical layer device is coupled to a,fiber optic network.

21. The method of claim 15, wherein the high speed physical layer device is coupled to a coaxial network.

22. The method of claim 15, further comprising providing the high speed physical layer device with every other turn access to the bus.

23. The method of claim 22, further comprising providing the high speed physical layer device with multiple addresses, such that the high speed physical layer device alternates between addresses each opportunity to access the bus.

24. The method of claim 22, further comprising providing the low speed physical layer devices with every other turn opportunities to access the bus, the opportunities for the low speed physical layer devices alternating with the opportunities of the high speed physical layer device.

25. The method of claim 15, wherein the bus interface device provides an opportunity to a particular connected physical layer device to access the bus by signaling a five bit address identifying the particular connected physical layer device.

26. The method of claim 25, further comprising using the arbiter to manipulate an address line coupled to the high speed physical layer device.

27. The method of claim 26, wherein the low speed physical layer devices occupy addresses one through seven and nine through seventeen, and further wherein the high speed physical layer device occupies address 8.

28. A system for managing data communication between physical layer devices in a cell based ATM network, comprising:
   a plurality of low speed physical layer devices;
   a high speed physical layer device;
   a bus connected to the low speed physical layer devices and the high speed physical layer device;
   a bus interface device connected to the bus, the bus interface device further coupled to the low speed physical layer devices and the high speed physical layer device, the bus interface device operable to provide equal opportunities to access the bus to any physical layer device connected to the bus by polling addresses associated with each physical layer device connected to the bus; and
   an arbiter coupled to the low speed physical layer devices, the high speed physical layer device and the bus interface device, the arbiter operable to provide the high speed physical layer device with disproportionately frequent access to the bus by selectively disabling the low speed physical layer devices from accepting an opportunity to access the bus.

29. The system of claim 28, wherein the plurality of low speed physical devices comprise sixteen low speed physical layer devices, wherein the sixteen low speed physical layer devices correspond to addresses one through 7 and 9 through 17;
   wherein the high speed physical layer device corresponds to address 8.

30. The system of claim 29, wherein the arbiter controls an address line to the high speed physical layer device, such that the high speed physical layer device can accept an opportunity to access bus granted to either address 0 or address 8.

31. The system of claim 30, wherein the high speed physical layer device receives an every other turn opportunity to access the bus.

32. The system of claim 31, wherein the high speed physical layer device alternates between addresses each opportunity to access the bus.

33. The system of claim 31, wherein the low speed physical layer devices receive every other turn opportunities to access the bus, the opportunities for the low speed physical layer devices alternating with the opportunities of the high speed physical layer device.

34. A method for managing access to a bus accessible by a high speed physical layer device and a plurality of low speed physical layer devices, comprising:
   monitoring a high speed physical layer device and a plurality of low speed physical layer devices connected to a bus; and
   selectively disabling the low speed physical layer devices from accepting an opportunity to access the bus in such a manner as to provide the high speed physical layer device with disproportionately frequent access to the bus.

35. The method of claim 34, wherein:
   the opportunity to access the bus is provided to each physical device in turn; and
   the step of selectively disabling comprises disabling the low speed physical layer devices from accepting the opportunity to access the bus every other turn.

36. An arbiter, comprising:
   a programmable logic device operable to:
      monitor a high speed physical layer device and a plurality of low speed physical layer. devices connected to a bus; and
      generate a signal disabling one or more of the low speed physical layer devices from accepting an opportunity to access the bus in such a manner as to provide the high speed layer device with disproportionately frequent access to the bus; and
   a disable line operable to communicate the signal to the low speed physical layer devices.

37. The arbiter of claim 36, wherein the programmable logic device is further operable to:
   determine that the high speed physical layer device is currently transferring information to the bus; and
   disable the high speed physical layer device from accepting an additional opportunity to. access the bus until the information transfer is complete.

* * * * *